US007580670B2

(12) United States Patent
Furukawa

(10) Patent No.: US 7,580,670 B2

(45) Date of Patent: Aug. 25, 2009

(54) BROADCAST DATA RECEIVER

(75) Inventor: Atsushi Furukawa, Gifu (JP)

(73) Assignee: Kyocera Corporation, Kyoto (JP)

( * ) Notice: Subject to any disclaimer, the term of this patent is extended or adjusted under 35 U.S.C. 154(b) by 281 days.

(21) Appl. No.: 11/277,807

(22) Filed: Mar. 29, 2006

(65) Prior Publication Data

US 2006/0223489 A1 Oct. 5, 2006

(30) Foreign Application Priority Data

Mar. 30, 2005 (JP) ............................ 2005-099923

(51) Int. Cl.
*H04H 1/00* (2006.01)
*G06F 17/00* (2006.01)

(52) U.S. Cl. .................. 455/3.02; 455/550.1; 455/3.01; 455/466; 455/566; 715/236; 715/237; 715/239; 715/760

(58) Field of Classification Search ................ 455/3.01, 455/3.02, 466, 566, 550.1
See application file for complete search history.

(56) References Cited

U.S. PATENT DOCUMENTS

| | | | | |
|---|---|---|---|---|
| 6,205,342 | B1 * | 3/2001 | Oakes et al. | 455/566 |
| 7,162,700 | B1 * | 1/2007 | Rashkovskiy | 715/771 |
| 7,231,441 | B2 * | 6/2007 | Smith et al. | 709/224 |
| 7,292,844 | B2 * | 11/2007 | Dowling et al. | 455/414.3 |
| 2003/0069038 | A1 * | 4/2003 | Takamine et al. | 455/556 |
| 2003/0174248 | A1 * | 9/2003 | Maruyama | 348/563 |
| 2006/0063562 | A1 * | 3/2006 | Hirai | 455/556.1 |

* cited by examiner

*Primary Examiner*—Huy Q Phan
(74) *Attorney, Agent, or Firm*—Morrison & Foerster LLP

(57) ABSTRACT

An object of the present invention is to provide a broadcast data receiver which is able to easily receive information about predetermined person. An address book 120 holds the personal identifying information for identifying person. The BML document extracting section 150 extracts the BML document described by the BML from the broadcast data. The personal information searching section 160 obtains the correspondence personal identifying information corresponding to the personal identifying information held by the address book 120 from the BML document.

8 Claims, 5 Drawing Sheets

120 Address Book

| ID | Name (in Chinese Character) | Name (in Katakana) | Telephone Number | Mail Address | Group | Address |
|---|---|---|---|---|---|---|
| 1 | Taro Sanyo | Taro Sanyo | 0584111111 | aaaa@aa.ne.jp | Family | Gifu-ken |
| 2 | Hanako Sanyo | Hanako Sanyo | 0584222222 | bbbb@bb.ne.jp | Family | Tokyo-to |
| 3 | Jiro Sanyo | Jiro Sanyo | 0584333333 | cccc@cc.ne.jp | Friend | Gifu-ken |
| 4 | Saburo Sanyo | Saburo Sanyo | 09044444444 | dddd@dd.ne.jp | Friend | N/A |
| 5 | Goro Sanyo | Goro Sanyo | 09055555555 | eeee@ee.ne.jp | Friend | N/A |

*Fig. 2*

```
<?xml version= "1.0"encoding="Shift_JIS"?>
<!DOCTYPE html PUBLIC"-//ARIB//DTD BML Document for Mobile//JA"
"http:www.arib.or.jp/B24/DTD/bml_13_0.dtd">
<?bml bml-version="13.0"?>
<html>
<head>
<title> Safety Information </title>
<script>
</head>
<body style="background-color.#FFFFFF;">
<div style="top:0px;left:0px;width:240px;height:80px;visiblity:visible">
        <img scr="title_16.png"style="top:0px;left:00px;width:240px;height:40px;"/>
        <p style="top:40px;left:0px:width:240px:height:20px">
                People were confirmed about safety
        </p>
        <p style="top:60px;left:20px;width:80px;height:20px;">
                Taro Sanyo
        </p>
        <p style="top:60px;left:140px;width:80px;height:20px">
                Jiro Sanyo
        </p>
</div>
</body>
</html>
```

*Fig. 3*

(a)

<a href = “mailto : aaaa@aa.ne.jp ”> Taro Sanyo </a>

(b)

<a href = “phoneto : 0584111111 ”> Jiro Sanyo </a>

*Fig. 4*

BROADCAST DATA RECEIVER

CROSS REFERENCE TO RELATED APPLICATIONS

This application is based upon and claims priority of Japanese Patent Application No. 2005-099923, the contents of which are incorporated herein by reference.

BACKGROUND OF THE INVENTION

1. Field of the Invention

The present invention relates to a broadcast data receiver.

2. Description of the Related Art

Data as well as images and voice are transmitted in the case of the conventional digital broadcast. Broadcast data sent and received via a broadcast wave may contain information about the well-being of someone (hereinafter called "safety information") . Such information usually contains the name or the contact information of people who are confirmed or unconfirmed. A user using a broadcast data receiver having a broadcast receiving function may know the safety of the family or friend based on such received information. However, it is hard for the user to search the information about their own family and friend if there is too much data of the safety information.

Therefore, the user is able to know the safety of the family and friend because the user is able to receive only the safety information of their own family and friend. (Refer to Japanese Tokkai 2003-348034). A broadcast data transmitter in which the information of a certain user's family or friend is stored in advance, which produces the safety information containing only stored personal information and sends it to the broadcast data receiver, is proposed (see Japanese Tokkai 2003-348034).

SUMMARY OF THE INVENTION

However, in the conventional technology above, the user has to register the personal information about their own family or friend in the broadcast data transmitter in advance. Moreover, since the communication line may be heavy in a time of a disaster, it is hard for the user of the broadcast data receiver to register the personal information in the broadcast data transmitter after the disaster.

Therefore, it is hoped that the broadcast data transmitter does not only produce the safety information containing only needed personal information but also the broadcast data receiver searches the safety information containing the needed personal information from the received broadcast data.

An object of the present invention is to provide a broadcast data receiver which is able to easily receive information about a predetermined person.

In order to solve the above problem, the preferred embodiment of the invention comprises following: a personal information holding unit for holding the personal identifying information identifying a person, a receiving unit for receiving the broadcast data, a markup description extracting unit for extracting a markup description information described by the markup language from the broadcast data received by the receiving unit, and a correspondence personal identifying information detector for obtaining a correspondence personal identifying information corresponding to the personal identifying information held by the personal information holding unit for the markup description information extracted by the markup description information extracting unit.

In accordance with the preferred embodiment of the invention, the personal information holding section holds the personal identifying information identifying the person, and the markup description information extracting section extracts the markup description information described by the markup language from the broadcast data.

In accordance with the preferred embodiment of the invention, a broadcast data receiver that is able to easily obtain information about a predetermined person is provided.

In accordance with the preferred embodiment of the invention, the personal identifying information relating to residence area specifying information specifying the residence area identified by the personal information is held in the personal information holding unit.

In accordance with the preferred embodiment of the invention, the personal information holding unit is an address book, and the address book is referred to if the communication terminal specifies a communication party.

In accordance with the preferred embodiment of the invention, the personal identifying information and a contact address indicating a personal contact address is identified by the personal identifying information in the personal information holding unit, and further comprising a display for displaying the contact address related to the correspondence personal identifying information and the correspondence personal identifying information is obtained by the correspondence personal identifying information detector.

This configuration further includes a broadcast program specific information holding unit for holding the broadcast specific information related to the broadcast data, wherein the correspondence personal identifying information detector obtains the correspondence personal identifying information from the broadcast related to the broadcast program specific information held by the broadcast program specific information holding unit.

In accordance with the preferred embodiment of the invention, a broadcast data receiver that is able to easily obtain information about a predetermined person is provided.

BRIEF DESCRIPTION OF THE DRAWINGS

The above and other objects and advantages of the present invention will become apparent and more readily appreciated from the following description of the preferred embodiments taken in conjunction with the accompanying drawings, of which:

FIG. 2 is an illustration showing an address book which is preferably used in accordance with embodiments of the present invention.

FIG. 3 is an illustration showing an example of the BML document which is preferably used in accordance with embodiments of the present invention.

FIGS. 4 (*a*) and 4(*b*) are illustrations showing the method for relating the contact information to the correspondence personal identifying information which is preferably used in accordance with embodiments of the present invention.

DETAILED DESCRIPTION OF THE PREFERRED EMBODIMENTS

Figure 1:
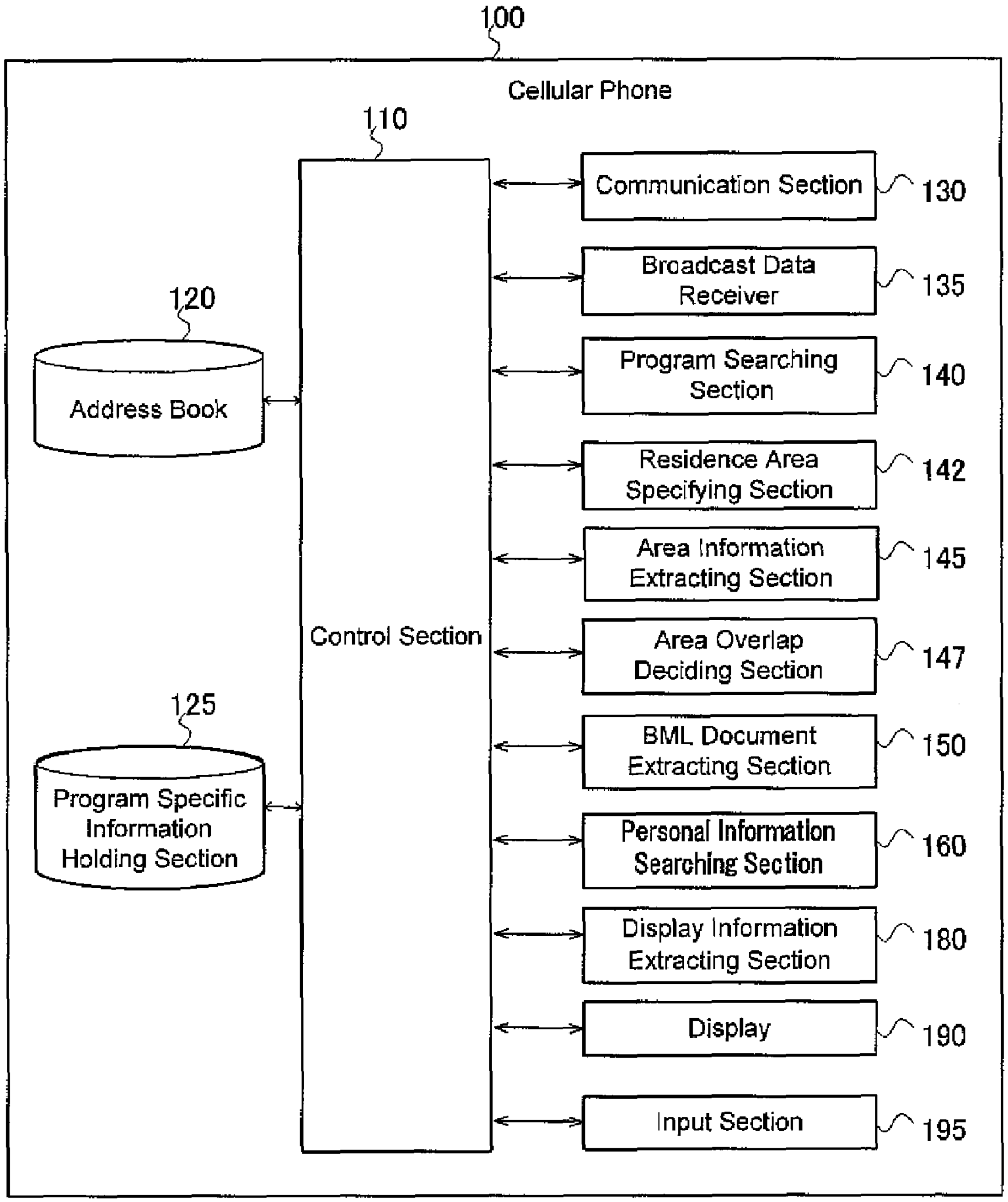
FIG. 1 is a function block diagram of a cellular phone which is preferably used in accordance with embodiments of the present invention.

The preferred embodiment of the present invention will be explained in accordance with the drawings. Reference will now be made in detail to the preferred embodiments of the present invention, examples of which are illustrated in the accompanying drawings, wherein like reference numerals refer to like elements throughout.

FIG. 1 shows a function block diagram of a cellular phone 100 in accordance with embodiments of the present invention. The cellular phone 100 has communication function with other devices via a cellular phone network in addition to a receiving function for receiving broadcast data sent via a broadcast wave. The cellular phone 100 is a mobile terminal and is also a broadcast data receiver for receiving broadcast data sent through the broadcast wave. Moreover, the cellular phone 100 has an obtaining function for obtaining predetermined personal information, that is, information of a family member or friend of the user who uses the cellular phone 100.

As illustrated in FIG. 1, the cellular phone 100 has a control section 110, an address book 120, a broadcast program specific information holding section 125, a communication section 130, a broadcast data receiver 135, a broadcast program searching section 140, a residence area specifying section 142, an area information extracting section 145, an area overlap deciding section 147, a BML (Broadcast Markup Language) document extracting section 150, a personal information searching section 160, a displaying information extracting section 180, a display 190 and an input section 195.

The control section 110 conducts the control of the other component parts and controls all parts of the cellular phone 100.

The address book 120 is the personal information holding section, holding personal identifying information for an identifying person. The personal information in the embodiments of the present invention is the data of the address book 120 which is used as the identification of the communicating party. The identification of the communicating party identifies, for example, the information of an outgoing call, the information of an incoming call, the address of sent e-mail and the address of received e-mail.

As described FIG. 2, the address book stores the personal information of plural persons. In the embodiments of the present invention, the personal information contains a name in Chinese characters, a name in Katakana, a telephone number, an e-mail address and a conventional address.

An ID shown in FIG. 2 is the identifying information for identifying the personal information. The name in Chinese characters or the name in Katakana is the personal identifying information for identifying a person. In the address book 120, the telephone number and e-mail address related to the name in Chinese characters or name in Katakana identifying the person and is the contact information indicating the personal contact address of the person. In the address book 120, the telephone number is related to the name in Chinese characters or the name in Katakana and is related to residence area specifying information for specifying a personal residence area of the person. A group is information added to the personal information by the user of the cellular phone 100. In the address book 120, an address is related to the name in Chinese characters or name in Katakana and is the residence area specifying information for specifying personal residence area of the person.

The broadcast program specific information holding section 125 holds broadcast program specific information related to the broadcast data. The broadcast program specific information held by the broadcast program specific information holding section 125 is the information specifying a searching target program for searching the personal identifying information.

For example, in a digital broadcast, an event_id utilized for program (event) identification is used as the broadcast program specifying information. The event_id is obtained from TS (Transport Stream) data and is unique on each broadcast data sent at predetermined time.

The event_id is contained in an EPG (Electric Program Guide) of the EIT (Event Information Table) that is sent in the TS data. Therefore, for example, the program specific information holding section 125 may hold the event_id extracted by the control section 110 from the broadcast data received by the broadcast data receiver 135. The EPG is able to be received via the Internet. Further, for example, the program specific information holding section 125 may hold the event_id extracted by the control section 110 from the EPG received via the cellular phone network and internet by the communication section 130.

The process of extracting the event_id by the control section 110 may be conducted based on the instruction inputted by the user via the input section 195 which is described below. Moreover, the instruction by the user may be conducted in the process of sending the broadcast data or in advance.

The communication section 130 conducts communication with the other device via the cellular phone network. Namely, the communication section 130 conducts the outgoing and incoming call process or the sending and receiving e-mail process.

The broadcast receiver 135 is a receiver for receiving the broadcast data. The broadcast receiver 135 demodulates the received broadcast data and converts it into TS data. The broadcast receiver 135 is implemented by a tuner with built-in demodulator or a tuner and a demodulator.

The program searching section 140 obtains the broadcast data related to the program specific information stored by the program specific information holding section 125 from the TS data received by the broadcast data receiver 135.

For example, the program searching section 140 obtains the EIT from the broadcast data and obtains the event_id contained in the EIT for receiving the information of the program on the air. If plural EITs are transmitted, the EIT with its section number being 0 (zero) is the present program. The program searching section 140 decides to search target program if the received event_id is the same as the event_id held by the program specific information holding section 125. The program searching section 140 obtains the broadcast data that is related with the event_id.

Moreover, the program searching section 140 may obtain the NIT (Network Information Table) by utilizing the area information extracting section 145, which is described in detail below, from the TS data.

The residence area specifying section 142 specifies a personal residence area of the personal information from the address and telephone number contained in the personal information held by the address book 120. The residence area specifying section 142 makes a connection between the residence area information indicating the specified residence area and the ID identifying the personal information about the residence area, then the residence area specifying section 142 provides the information to the area overlap deciding section 147 as described below.

For example, the residence area specifying section 142 specifies the residence area by means of extracting the prefecture name from the address held by the address book 120, or by extracting the residence area from the area code of the fixed-line telephone number. For example, in the address book shown in FIG. 2, the residence area of "Taro Sanyo" and "Jiro Sanyo" are specified as "Gifu-ken" based on the address. The residence area specifying section 142 makes connection between "1" indicating the ID of the "Taro Sanyo" and "Gifu-ken" and provides them to the area overlap deciding section 147. Also the residence area specifying section 142 makes the connection between "3" indicating the ID of the "Jiro Sanyo" and "Gifu-ken" and provides them to the area overlap deciding section 147. Alternatively, the residence area of the "Hanako Sanyo" is specified "Tokyo-to" based on the telephone number. The residence area specifying section 142 makes connection between "2" indicating the ID of "Hanako Sanyo" and "Tokyo-to" and provides them to the area overlap deciding section 147.

The personal information identified by the ID "4" and "5" contains a cellular phone number as the telephone number. The residence area specifying section 142 is not able to specify the residence area of "Saburo Sanyo" and "Goro Sanyo" because the address is not inputted. In the embodiments of the present invention, the residence area specifying section 142 does not input the information about a person having an unspecified residence area into the area overlap deciding section 147.

The area information extracting section 145 extracts the broadcast target area information indicating the broadcast target area from the broadcast data received by the broadcast data receiver 135.

In the embodiment of the present invention, the area information extracting section 145 extracts the broadcast target area information from the broadcast data obtained by the program searching section 140 among the broadcast data received by the broadcast data receiver 135.

For example, the area information extracting section 145 obtains the broadcast data received by the program searching section 140 and the NIT from the program searching section 140. The area information extracting section 145 obtains a network_id contained in the NIT. The network_id is the information identifying the broadcast station sending the broadcast data. The network_id contains the broadcast target area information indicating the broadcast target area, for example, "Chukyo wide area" or "Gifu-ken area." The area information extracting section 145 obtains the broadcast target area information contained in the network_id.

The area overlap deciding section 147 decides whether the residence area specified by the residence area specifying section 142 and the broadcast target area indicated by the broadcast target area information extracted by the area information extracting section 145 overlap or not.

In particular, the area overlap deciding section 147 obtains the residence area information indicating the specified residence area and the ID related to the residence area information from the residence area specifying section 142 and further obtains the extracted broadcast target area information and the broadcast data from the area information extracting section 145.

The area overlap deciding section 147 compares the residence area indicated in the received residence area information and the broadcast target area indicated in the broadcast target area information, then provides the ID identifying the personal information containing the residence area information and the broadcast data to the BML document extracting section 150 if there is overlapping.

For example, in the case that the broadcast target area is specified the Gifu-ken area, the residence of the "Taro Sanyo" and "Jiro Sanyo" and the broadcast target area are overlapping. On the other hand, the residence of the "Hanako Sanyo" and the broadcast target area are not overlapping. Therefore, the area overlap deciding section 147 provides the ID "1" about the "Taro Sanyo", The ID "3" about "Jiro Sanyo" and the broadcast data to the BML document extracting section 150.

The BML document extracting section 150 is the markup description information extracting section extracting the markup language description information described by the markup language from the broadcast data received by the broadcast data receiver 135. The markup language in the embodiment of the present invention is the BML of the multimedia encoding designed by ARIB (Association of Radio Industries and Business), the markup language description information described by the markup language is the BML document.

In the embodiment of the present invention, the BML document extracting section 150 extracts the BML document from the broadcast data provided from the area overlap deciding section 147 of the broadcast data received by the broadcast data receiver 135.

In particular, the BML document extracting section 150 obtains the ID identifying the personal information in the address book 120 and the broadcast data from the area overlap deciding section 147. The BML document extracting section 150 analyzes the content of the TS header contained in the received TS data. The BML document extracting section 150 further divides the information multiplexed in the TS data into the image, the audio, the data broadcasting description data and adding data, then extracts the BML document from the data broadcasting description data.

The BML document extracting section 150 provides the extracted BML document and the ID obtained from the area overlap deciding section 147 with the personal information searching section 160 described below.

FIG. 3 shows the example of the BML document. The data broadcasting description data contains the JPEG format picture and etc., in addition to the BML document. For example, a DEMUX (de-multiplexer) is used as the BML document extracting section 150.

The image or audio obtained by the BML document extracting section 150 is decoded by the decoder, not shown in the figure. The image data is displayed on the display device 190 such as a liquid crystal display. The audio data is provided to the audio output device such as the speaker by the audio control section not shown in the figure.

The personal information searching section 160 is the correspondence personal identifying information detector for obtaining the correspondence personal identifying information corresponding to the personal identifying information (the name in Chinese characters, the name in Katakana) held by the address book 120 from the BML document extracted by the BML document extracting section 150. The personal information searching section 160 obtains the correspondence personal identifying information about the personal identifying information related to the residence area information if the residence area and the broadcast target area are decided to be overlapping by the area overlap deciding section 147.

In particular, the personal information searching section 160 obtains the BML document and the ID from the BML document extracting section 150, then searches the information corresponding to the personal identifying information about the obtained ID and obtains the correspondence personal identifying information.

The BML document contains a part describing the displaying character string, a part describing the displaying format and a part describing the controlling information called the script. The target searching the correspondence personal identifying information by the personal information searching section 160 is the part of which the displaying character string is described. Also, the binary data is also the target for searching the correspondence personal identifying information by the personal information searching section 160 if the BML document contains the binary data as the table data.

For example, in the address book 120 shown in FIG. 2, the personal information searching section 160 searches the information corresponding the ID "1" and "3" obtained from the BML document extracting section 150 related to the name in Chinese characters and the name in Katakana from the BML document shown in FIG. 3. The personal information searching section 160 obtains the "Taro Sanyo" and "Jiro Sanyo" correspondence personal identifying information in reference to the BML document shown in FIG. 3 and the address book 120 shown in FIG. 2.

The personal information searching section 160 may search the character string corresponding the personal identifying information simply from the beginning of the address book 120 or the character string corresponding the personal identifying information using a correspondence character string searching algorithm common use.

The display information extracting section 180 obtains the ID of the personal information corresponding to the correspondence personal identifying information received from the personal information searching section 160 and the BML document specifying the correspondence personal identifying information. The display information extracting section 180 extracts the display information, which is displayed on the display device, containing the correspondence personal identifying information from the obtained BML information.

In particular, the display information extracting section 180 decides whether the whole document containing the correspondence personal information or a part of the BML document is displayed, then extracts the display information in accordance with the decision. The display information extracting section 180 extracts the whole BML document as the display information if the display information extracting section 180 decides to display the whole BML document or extracts the surrounding information of the correspondence personal identifying information as the display information if the display information extracting section 180 decides to display a part of the BML document.

For example, the display information extracting section 180 may decide whether the whole BML document or a part of the BML document is displayed based on information preset by the user. Alternatively, the display information extracting section 180 may decide to display the whole BML document if the data size of the BML document is smaller than a predetermined data size or to display a part of the BML document it the data size is larger than a predetermined size.

For example, a part of the BML document is the paragraph, the line, the table, etc. containing the correspondence personal identifying information. The partial size of the BML document may be decided in advance by user.

Moreover, the display information extracting section 180 adds the contact information related to the correspondence personal identifying information to the correspondence personal identifying information obtained by the personal information searching section 160.

In particular, the display information extracting section 180 obtains the address or e-mail address related to the correspondence personal identifying information from the address book 120 based on the ID obtained from the personal information searching section 160.

The display information extracting section 180 adds the telephone number or e-mail address to the correspondence personal information by means of replacing the character string of the "Taro Sanyo" contained in the BML document shown in FIG. 3 with the character string shown in either FIG. 4(*a*) or 4(*b*). In FIG. 4 (*a*), the e-mail address related to the "Taro Sanyo" in the address book 120 is added. In FIG. 4 (*b*), the telephone number related to the "Taro Sanyo" in the address book 120 is added.

The display information extracting section 180 provides the display information with the added contact address information to the display 190.

The display 190 displays the broadcast data.

In particular, the display 190 receives the display information with the added contact information from the display information extracting section 180, then provides the received information to the display device such as a liquid crystal display.

In other words, the display information extracting section 180 and the display 190 act as the display function. The display information extracting section 180 and the display 190 display the contact information added to the correspondence personal identifying information received by the personal information searching section 160 and displaying.

The input section 195 receives input from an input device such as a button. For example, the input section 195 detects the name of "Taro Sanyo" specified by pressing of a button when the display information with the added contact information as described in FIG. 4 is displayed. In this case, as described in FIG. 4(*a*), "aaaa@aa.ne.jp" is set as the e-mail address and the sending e-mail function is started if the e-mail address is added as the contact information. Moreover, the content of the e-mail and e-mail address are provided to the communication section 130, the e-mail is sent via the communication section 130 if the user pressing the button specifies the e-mail sending process. Also, as described in FIG. 4(*b*), "0584111111" is provided to the communication section 130, the communication section 130 conducts the outgoing call if the telephone number is added as the contact information.

Figure 5:
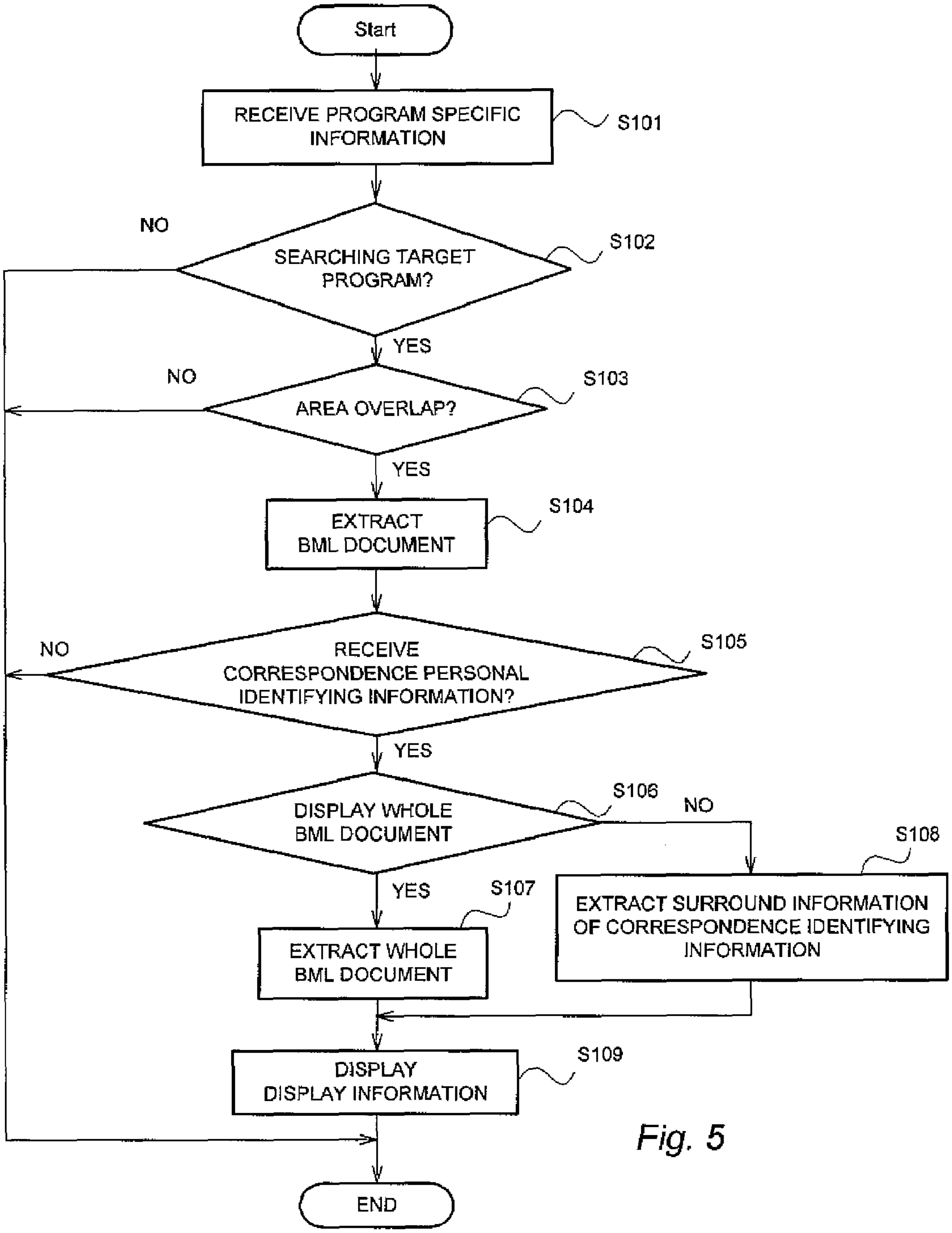
FIG. 5 is a flow chart showing the method for displaying the displaying information containing the correspondence personal identifying information.

Hereafter, the displaying process of the display information containing the correspondence personal identifying information by the cellular phone 100 is explained in accordance with FIG. 5.

In step S101, the program searching section 140 receives the program specifying information from the TS data.

In step S102, the program searching section 140 decides whether it is the program of the searching target or not in accordance with the program specific information holding section 125.

In step S103, the area overlap deciding section 147 decides whether the residence area specified by the area residence specifying section 142 and the broadcast target area indicated by the broadcast target area information extracted by the area information extracting section 145 are overlapping or not.

In step S104, the BML document extracting section 150 extracts the BML document if the area overlap deciding section 147 decides that there is overlapping in step S103.

In step S105, the personal information searching section 160 receives the correspondence personal identifying information from the BML document.

In step S106, the display information extracting section 180 decides whether to display the whole BML document or a part of the BML document if the personal information searching section 160 is able to receive the correspondence personal information.

In step S107, the display information extracting section 180 extracts the BML document as the display information if the display information extracting section 180 decides to display the whole BML document.

On the other hand, in step S108, the display information extracting section 180 extracts the surrounding information of the correspondence personal identifying information as the display information if the display information extracting section 180 decides to display a part of the BML document.

In the step S109, the display information added to the contact information by the display information extracting section 180 is displayed by the display 190.

In accordance with the cellular phone 100 of the preferred embodiments of the present invention, the address book 120 holds the personal identifying information identifying the person, and the BML document extracting section 150 extracts the BML document described by the BML from the broadcast data. The personal information searching section 160 receives the correspondence personal identifying information corresponding to the personal identifying information held by the address book 120 from the BML.

As described above, the cellular phone 100 is able to receive information about a predetermined person from received broadcast data easily. Therefore, the user of the cellular phone 100 is able to know the information about their own family or friend easily.

In the preferred embodiment of the present invention, the residence area specifying section 142 specifies the personal residence area from the address or telephone number related to the personal identifying information in the address book 120. The area information extracting section 145 extracts the broadcast target area information indicating the broadcast target area of the broadcast data. The area overlap deciding section 147 decides whether the specified residence area and the broadcast target area indicated by the extracted broadcast target area information are overlapping or not.

The personal information searching section 160 searches and obtains the correspondence personal identifying information only if the area overlap deciding section 147 decides there is overlap. Therefore, the cellular phone 100 is able to obtain only information with a high possibility of correlating to the person identified by the personal identifying information held in the address book 120.

In the preferred embodiment of the present invention, the cellular phone 100 is used as the broadcast data receiver, the address book 120 is used as the personal information holding section. The cellular phone usually has an address book sending and receiving e-mail, placing an outgoing call, and receiving an incoming call.

As described above, the user of the cellular phone 100 is able to obtain the information about a predetermined person without the inputting personal information about user's family or friend. Therefore, the user is able to know the information about their own family or friend more easily.

In the preferred embodiment of the present invention, the display information extracting section 180 adds the contact information of the correspondence personal identifying information to the display information containing the correspondence personal identifying information, and the display 190 displays the display information added to the contact information.

Therefore, the preferred embodiment of the present invention is able to provide the device easily contacting the person identified by the correspondence personal identifying information.

Moreover, the correspondence personal identifying information is obtained by the personal information searching section 160 when the program specific holding section 125 holds the program specific information associated with the broadcast data and the target program of the program searching section 140 is associated with the program specific information held by the program specific information section 125.

For example, the cellular phone 100 is able to receive the correspondence personal identifying information from only the broadcast data about the searching target program set by the user. Therefore, it is able to improve the process. Moreover, the user is able to receive only necessary information.

For example, in the preferred embodiment of the present invention, the broadcast data receiver is the cellular phone 100, but the broadcast data receiver may be another device having a broadcast receiving function, for example, PDA (Personal Digital Assistant).

The personal identifying information is the name in Chinese characters or the name in Katakana, but the personal identifying information may be the information being able to identify, for example, the Resident Register Code Number in the Basic Resident Register Network.

Moreover, in the preferred embodiment of the invention, the cellular phone 100 may not have the program searching section 140 and the area overlap deciding section 147. The cellular phone 100 obtains the correspondence personal identifying information when the broadcast program searching section 140 has searched the target broadcast program, and the area overlap deciding section 147 has decided the residence area of the person and the broadcast target area is overlapping.

Moreover, the personal information searching section 160 may search the character string corresponding to a part of the personal identify information held by the address book 120. The user may specify a part of the personal identifying information to be searched by the personal information searching section 160. For example, the personal information searching section 160 may target only the personal identifying information contained the personal information containing "family" as the group.

The personal information searching section 160 receives the correspondence personal identifying information from the BML document received from the BML document extracting section 150, but the personal information searching section 160 may search the correspondence personal identifying information only if the BML document contains "safety information" of the string.

Although a few preferred embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A broadcast data receiver which receives broadcast data transmitted via a broadcast wave, comprising:

a personal information holding unit for holding personal identifying information identifying a person;

a receiving unit for receiving the broadcast data;

a markup description extracting unit for extracting markup description information described by a markup language from the broadcast data received by the receiving unit;

a correspondence personal identifying information detector for obtaining correspondence personal identifying information corresponding to the personal identifying information held by the personal information holding unit for the markup description information extracted by the markup description information extracting unit;

a residence area specifying unit for specifying a residence area based on residence area specifying information;

an area information extracting unit for extracting broadcast target area information indicating a broadcast target area from the broadcast data received by the receiving unit; and an area overlap deciding unit for deciding whether the residence area specified by the residence area specifying unit and the broadcast target area indicated by the broadcast target area information extracted by the area information extracting unit are overlapping.

2. The broadcast data receiver according to claim 1, wherein the correspondence personal identifying information detector obtains the correspondence personal identifying information of the personal identifying information related to the residence area specifying information if the area overlap deciding unit decides that the residence area and the broadcast target area are overlapping.

3. The broadcast data receiver according to claim 2, wherein the broadcast receiver is a communication terminal, the personal information holding unit is an address book, and the address book is referred to if the communication terminal specifies a communication party.

4. The broadcast data receiver according to claim 2, wherein the personal identifying information and a contact address indicating a personal contact address are identified by the personal identifying information in the personal information holding unit, further comprising a display for displaying the contact address related to the correspondence personal identifying information and the correspondence personal identifying information obtained by the correspondence personal identifying information detector.

5. The broadcast data receiver according to claim 2, further comprising a broadcast program specific information holding unit for holding broadcast specific information related to the broadcast data, wherein the correspondence personal identifying information detector obtains the correspondence personal identifying information from the broadcast related the broadcast program specific information held by the broadcast program specific information holding unit.

6. The broadcast data receiver according to claim 1, wherein the broadcast receiver is a communication terminal, the personal information holding unit is an address book, and the address book is referred to if the communication terminal specifies a communication party.

7. The broadcast data receiver according to claim 1, wherein the personal identifying information and a contact address indicating a personal contact address are identified by the personal identifying information in the personal information holding unit, further comprising a display for displaying the contact address related to the correspondence personal identifying information and the correspondence personal identifying information obtained by the correspondence personal identifying information detector.

8. The broadcast data receiver according to claim 1, further comprising a broadcast program specific information holding unit for holding the broadcast specific information related to the broadcast data, wherein the correspondence personal identifying information detector obtains the correspondence personal identifying information from the broadcast related the broadcast program specific information held by the broadcast program specific information holding unit.

* * * * *